Oct. 6, 1964 C. HAHTO 3,151,876
COLLAPSIBLE SNOW SCOOTER
Filed July 26, 1963
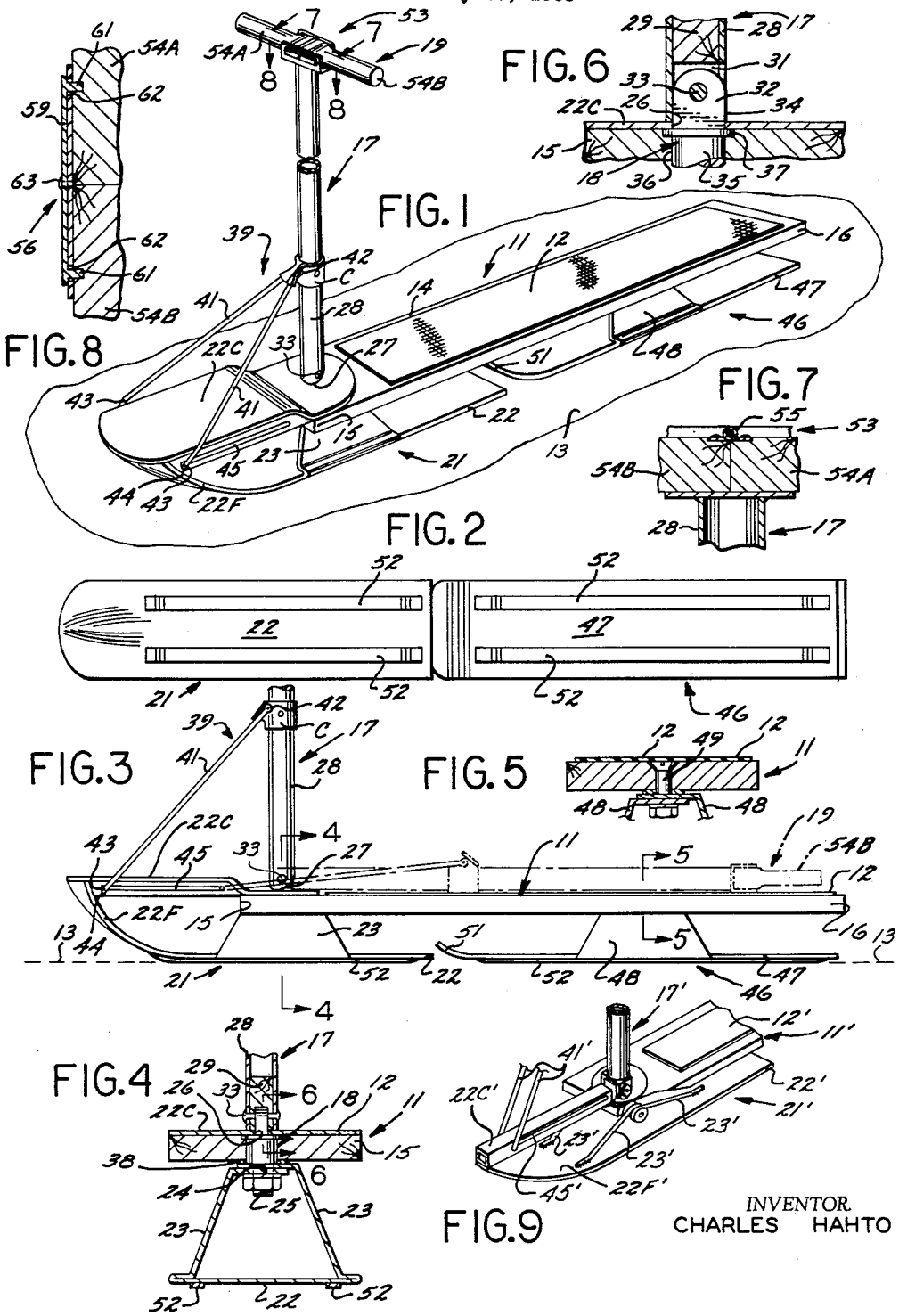
INVENTOR.
CHARLES HAHTO

United States Patent Office 3,151,876
Patented Oct. 6, 1964

3,151,876
COLLAPSIBLE SNOW SCOOTER
Charles Hahto, 1755 N. Berendo St.,
Los Angeles 27, Calif.
Filed July 26, 1963, Ser. No. 297,888
10 Claims. (Cl. 280—16)

Generally speaking, the present invention relates to a snow scooter and, more particularly, pertains to a novel snow scooter which is of a controllably steerable type and which is also of a controllably collapsible or foldable structure adapted to be very simply and easily collapsed into a small space volume, nearly flat configuration for easy portability and/or storage during non-use periods. The scooter is also adapted to be very quickly and easily effectively expanded from the collapsed or folded position into a fully operative relationship of the various elements thereof and to be rigidly locked in said fully operative relationship for subsequent use as a controllably steerable snow scooter until such time as it is controllably unlocked and collapsed for the next transportation or storage period.

It should be noted that the scooter construction is such that, when collapsed, it is very easily carried manually and is also very easily stored and/or carried in (or on) virtually any type of vehicle since it requires so little storage space when in the collapsed configuration. This is made possible by reason of the fact that the steering post means, which is upstanding when the scooter is in locked operative relationship, can be effectively collapsed into a substantially or nearly flat parallel relationship with respect to the longitudinal foot-engageable platform means of the scooter with the handle means extending rearwardly therealong whereby to provide a flat collapsed structure adapted to be very easily carried manually by grasping it at either end or elsewhere as desired. The substantially flat configuration, when collapsed, facilitates the storage of the device for easy transport in (or on) a vehicle or the like or for storage for a period of time in a fixed storage location until the next time the scooter is to be removed therefrom for subsequent use.

With the above points in mind, it is an object of the present invention to provide a novel collapsible snow scooter of the character referred to hereinbefore in any of the various generic and/or specific aspects mentioned above, either individually or in combination, and which is so constructed as to be capable of being very quickly and easily collapsed from operative relationship into a fully collapsed storage and portability relationship by means of novel steering post mounting or support means which can be controllably positioned in either the operative relationship or the collapsed non-operative relationship in a very easily manually effected manner.

It is a further object of the present invention to provide a novel collapsible snow scooter of the character referred to hereinbefore including front and rear snow-engageable planing members underlying a foot-engageable platform and with the front snow-engageable planing member being effectively connected with respect to a collapsible steering post means which is adapted to be upright when in locked operative relationship, and with both of said structures being rotatively mounted with respect to the front end of the foot-engageable platform means whereby to provide a completely steerable and controllably collapsible snow scooter having the advantages referred to above.

It is a further object of the present invention to provide a novel controllably steerable and controllably collapsible snow scooter as referred to above which is of extremely simple, inexpensive, foolproof, lightweight, readily portable, structurally strong construction which is easy to expand into operative use configuration and to collapse into folded storage configuration, when desired, such as to be conducive to widespread use thereof.

Further objects are implicit in the detailed description which follows hereinafter (which is to be considered as exemplary of, but not specifically limiting, the invention), and said objects will be apparent to persons skilled in the art after a careful study of the detailed description which follows hereinafter.

For the purpose of clarifying the nature of the present invention, one exemplary embodiment of the invention and certain slight modifications of portions thereof, are illustrated in the hereinbelow-described figures of the accompanying single drawing sheet and are described in detail hereinafter.

FIG. 1 is a reduced-size perspective view of one exemplary form of the invention shown locked in effectively expanded or operative position or relationship of the various elements thereof.

FIG. 2 is a bottom plan view of the apparatus of FIG. 1. In other words, this view shows the bottom surfaces of the front and rear snow-engageable planing members as seen looking directly upwardly at them from a position therebelow. All portions of the apparatus behind the bottom surfaces of said front and rear snow-engageable planing members are removed from this view for drawing simplification.

FIG. 3 is a fragmentary side elevational view of the exemplary form of the invention as seen looking directly at the near side of the apparatus in the assembled operative relationship shown in FIG. 1 and with the upper portion of the steering post means broken away for drawing space conservation reasons. While this view shows the steering post means and the steering post mounting or support means holding same in locked operative relationship in solid or full lines, the unlocked and effectively collapsed relationship thereof is shown in phantom in FIG. 3.

FIG. 4 is a somewhat enlarged fragmentary cross-sectional view, taken in the direction of the arrows 4—4 of FIG. 3.

FIG. 5 is a fragmentary cross-sectional view drawn to the same enlarged scale as FIG. 4, taken in the direction of the arrows 5—5 of FIG. 3.

FIG. 6 is a fragmentary view, partly in elevation and partly in section, taken in the direction of the arrows 6—6 of FIG. 4 and is drawn to a slightly larger scale than FIG. 4.

FIG. 7 is a fragmentary sectional view, taken in the direction of the arrows 7—7 of FIG. 1 through a central portion of the handle means when in transversely directed locked operative relationship and is drawn to a somewhat larger scale than FIG. 1.

FIG. 8 is another fragmentary sectional view of the handle means of FIG. 1 when in the locked operative relationship shown in said figure and is taken in the direction of the arrows 8—8 of FIG. 1 and is also drawn to a somewhat larger scale than FIG. 1.

FIG. 9 is a fragmentary perspective view illustrating modifications of certain portions of the first form of the invention with particular respect to the structural connection members connecting the underlying front and rear snow-engageable planing members to the platform means, and with respect to the rearwardly directed coupling member of the front snow-engageable platform member and the pivotal connection thereto of the handle means. In other words, in this view, said structural connection members are shown as being formed of wire rather than being of planar thin-sheet metal construction and certain of the couplings or connections thereof are similarly slightly modified in order to provide a construction of minimal expense whereby to be conducive to the most widespread usage thereof.

Generally speaking, the first exemplary form of the invention illustrated in FIGS. 1–8 is shown for illustrative but non-specifically limiting purposes as comprising a collapsible or foldable snow scooter of what might be termed essentially a ski scooter type of construction—that is, it generally simulates in appearance a single ski, and is shown as comprising a longitudinal foot-supporting platform means, indicated generally at 11, and which, in the exemplary form shown, is of substantially rectangular configuration, as seen in plan view, and is shown as being made of wood in the form of a plank of a substantially constant vertical thickness. However, the configuration and material thereof may be modified within the scope of the invention.

The longitudinal platform means 11, in said exemplary first form of the invention, is provided on its top with a normally substantially horizontally positioned foot-engageable surface means, indicated at 12, which is adapted to receive, engage and support one foot of a person while said person is propelling the scooter with his other foot by intermittently moving it in propelling relationship with respect to an underlying snow-covered ground surface, such as is indicated fragmentarily and somewhat diagrammatically at 13 in FIGS. 1 and 3. Of course, in certain instances where other means of propulsion may be provided, the person may temporarily place both feet on the foot-engageable surface means 12, if desired.

In said exemplary first form of the invention, the foot-engageable surface means 12 may comprise a rubber or plastic mat or the like cemented or otherwise suitably affixed to the top surface 14 of the foot-engageable platform means 11. However, in other forms of the invention said mat may be eliminated entirely and said top surface 14, or at least a central part thereof, may be said to effectively comprise said foot-engageable surface means 12.

In the exemplary first form of the invention, said longitudinal platform means 11 has a front end 15 and a rear end 16 and is provided adjacent to said front end 15 with upwardly directed steering post means, one exemplary form of which is indicated generally at 17, which is effectively rotatively coupled by rotary coupling means, indicated generally at 18, and best shown in FIG. 4, with respect to a front portion of the platform means 11 whereby to provide for manually controlled rotation of said steering post means 17 by reason of manual rotary operation of the handle means, indicated generally at 19 in FIGS. 1 and 3, carried at the top of the steering post means 17 so as to correspondingly rotate around a vertical axis coincident with said upright steering post means 17.

Said exemplary first form of the invention also includes an underlying front snow-engageable planing means, indicated generally at 21, which is effectively connected with respect to the bottom end of said steering post means 17 for simultaneous rotation therewith. This rotation will effectively result in controllable steering action for the front end of the scooter since, obviously, the scooter will tend to turn in whichever direction the front snow-engageable planing means 21 is turned as a result of the turning of the steering post means 17 by manually applying torque to the handle means 19.

In the exemplary first form of the invention illustrated, said front snow-engageable planing means 21 includes a substantially flat thin-sheet planing member 22 spacedly mounted below the front portion of the platform means 11 and the bottom end of the steering post means 17 by upwardly directed rigid connection and structural supporting means comprising the thin-sheet side panel members 23 formed integrally of the same sheet of metallic material as the bottom planing member 22 and extending upwardly at the center part of each side thereof to an inwardly bent position for rigid fastening attachment, as best indicated at 24 in FIG. 4, by interiorly threaded fastening means 25, with respect to the reduced-size exteriorly threaded bottom end of the rotary coupling means 18 rotatively interconnecting the bottom end of the steering post means 17 with respect to the platform 11—said connection of said structural support member panels 23 being such as to effectively rotatively mount said front snow-engageable planing means 21, by means of said rotary coupling means 18, with respect to the platform means 11 in the same manner as the rotary mounting of said steering post means 17 relative thereto and for simultaneous rotation with said steering post means 17. Also, said connection is such as to effectively lock said front snow-engageable planing means 21 and the entire rotary coupling means 18 and the bottom end of the upright steering post means 17 in vertically longitudinally axially locked relationship (relative to each other and with respect to the platform means 11) whereby to cause said front snow-engageable planing means 21 to provide firm support for the front portion of said platform means 11 and yet to be completely freely rotatable with respect thereto in response to rotation of the upright steering post means 17.

In said exemplary first form of the invention, said front snow-engageable planing means 21 is provided with an upwardly curved forward end portion, as indicated 22F, and a rearwardly directed coupling member 22C which is effectively connected in rotatively keyed manner by rectangular aperture 26 in said member 22C and the spatulate upper end member 32 of the rotary coupling means 18 with respect to the steering post means 17 at a location immediately above the top surface of the platform means 11. Said member 22F is also connected in a longitudinally relatively locked relationship with respect to said steering post means 17 by reason of its integral connection with respect to the bottom member 22 of the front snow-engagable planing means 21 and also by reason of the fact that it lies under a curved cam shaped shoulder portion 27 of an outer tubular member 28 comprising the upper portion of the steering post means 17; said tubular member 28 receiving an upwardly directed cylindrical insert member 29 at the bottom end thereof, as best shown in FIGS. 4 and 6, which is effectively slotted in the lower portion thereof as indicated at 31 for the reception of said similarly shaped upwardly directed spatulate member 32 (of the rotary coupling means 18) which is horizontally pivotally connected with respect to said insert member 29 and with respect to the opposite portions of the outer tubing 28 by pivot pin means 33, as best shown in FIGS. 4 and 6.

It should also be noted that the rearwardly directed surface of the outer tubing 28 has a rearwardly directed cut-out portion therein along the rear surface at the location indicated at 34, thus providing an arrangement such that the tubing 28, comprising the upper portion of the steering post means 17, can be readily moved from the upright position shown in FIGS. 1, 3, 4, and 6, in solid or full lines into the folded or collapsed position shown in phantom in FIG. 3, where it lies immediately over, and substantially parallel to, the platform means 11.

However, it should also be noted that said steering post means 17 is not freely pivotal in the opposite direction—that is, forwardly from the upright relationship shown in FIGS. 1, 3, 4, and 6, by reason of the fact that the outer tubing 28 does not have a frontally positioned cut-out portion similar to the rearwardly positioned one indicated at the location shown at 34 and, therefore, the front portion of the bottom edge of said tube 29 will firmly abut the immediately underlying portion of the front coupling member 22C and force it against the underlying portion of the front end 15 of the platform means 11, as is best shown in FIG. 6.

The spatulate member 32 is connected to a cylindrical lower portion 35 of the rotary coupling means 18 which extends through an aperture 36 in the wooden plank forming the front portion of the platform means 11 and which is freely rotatively mounted therein in a manner such as to effectively define the hereinbefore-mentioned rotary coupling means 18.

A shoulder 37 is provided at the junction of the members 32 and 35 for abutment with a corresponding enlarged portion of the hole 36 adjacent to the top surface of the platform means 11 for preventing downward vertical movement thereof with respect to the platform means 11. A similar shoulder or collar 38 may be provided adjacent to the bottom end thereof immediately below the bottom surface of the platform means 11 and the previously mentioned threaded fastening means 25 includes a shaft portion extending vertically through the inwardly formed portions of the side structural support members 23 of the front snow-engageable planing means 21 which is effectively connected with respect to the cylindrical portion 35 whereby to provide for rigid vertical locking for all of the elements adjacent to, and associated with, the rotary coupling means 18 while freely rotatively mounting all of said elements with respect to the platform means 11.

The exemplary first form of the invention also includes controllably collapsible steering post mounting or support means, one form of which is generally indicated at 39, for effectively interconnecting a lower portion of said steering post means 17 and said coupling member 22C of the front snow-engageable planing means 21 for controllable movement into an operative position such as is clearly shown in FIGS. 1, 3, 4, and 6 (with said steering post means 17 in an upwardly directed relationship) and for controllable collapsing and folding pivotal movement of said steering post means 17 about a horizontal axis coincident with the horizontal pivot pin 33 and downwardly into the substantially horizontal relationship shown in phantom in FIG. 3.

In said exemplary first form of the invention, said controllably collapsible steering post mounting or support means 39 comprises two angularly downwardly and forwardly outwardly divergingly directed structural members 41 having rear ends provided with and pivotally connected with respect to pivotal junction means 42 carried by the steering post means 17 longitudinally spaced from the bottom end thereof, and with said two structural members 41 having forward end portions, as indicated at 43, controllably lockably engageable in either of two different longitudinally displaced extreme positions (one of which is shown in solid lines in FIGS. 1 and 3 and the other of which is shown in phantom in FIG. 3) with respect to the coupling member 22C whereby to provide for said controlled pivotal movement of said steering post means 17 between the horizontal fully collapsed position shown in phantom in FIG. 3 and the upright operative position shown in FIGS. 1, 3, 4, and 6, and also whereby to provide for the effective locking of same in said upright operative position by means of retaining means carried by the sides of said coupling member 22C in a position for controllable retaining engagement and disengagement with respect to said forward ends 43 of said structural members 41 whereby to retain the steering post means 17 in said upright position when the device is in locked operative relationship as is best shown in FIGS. 1 and 3, wherein said retaining means are shown as comprising offset notch means 44 carried at the front of longitudinal slot means 45

It will readily be understood that the inwardly directed front end portions 43 of the structural members 41 can be slidably moved along slot means between either of the two extreme positions shown in FIG. 3 and, when in the forward position shown in solid lines in FIGS. 1 and 3, will normally come to rest in the offset locking notch or detent means 44 whereby to firmly position the structural members 41 in the relationship shown in FIGS. 1 and 3 which, by way of the locking collar C affixed to the steering post means 17, will firmly lock it in the upright position shown in FIGS. 1, 3, 4, and 6. However, in order to fold down the steering post means 17, all that is necessary to do is to move the front ends 43 of the members 41 out of the locking notch or detent means 44 and to then slidably move them rearwardly along the slot means 45, while folding down the upright steering post means 17, until said elements lie in the position shown in phantom lines in FIG. 3. If desired, a rear notch or detent means similar to the front notch or detent means 44 may be provided at the rear of the slot means 45 for locking the steering post means 17 in the collapsed position. However, this is optional.

In the first form of the invention, the platform means 11 is also provided with a rear snow-engageable planing means, indicated generally at 46, which has a bottom planing member or portion 47 similar to the planing member or portion 22 of the front snow-engageable planing means 21 and which similarly spacedly underlies a rear portion, adjacent to the rear end 16, of the platform means 11 in substantially the same manner as the spaced underlying relationship of said front snow-engageable planing member 21 with respect to the front portion of the platform means 11 and with said rear planing means 46 being positioned immediately behind the front planing means 21 and aligned therewith and also being similarly provided with upwardly directed rigid connection and structural supporting panel member portions 48 similar to the corresponding front elements 23 and rigidly connecting the entire rear snow-engageable planing means 46 to the bottom surface of the platform means 11 by means of threaded fastener means 49, as best shown in FIG. 5, whereby to provide firm support for the rear portion of the platform means 11 with respect to an underlying snow-covered surface as indicated at 13 in FIGS. 1 and 3. The rear snow-engageable planing member 47 is provided with a slightly upwardly curved forward end 51 and each of the front and rear snow-engageable planing members 22 and 47 is provided with a pair of longitudinal substantially parallel runners having bottom edges similarly extending slightly below the bottom surface of the corresponding snow-engageable planing member. Since these elements are the same in the case of both the front and rear snow-engageable planing members 22 and 47, they are indicated by the same reference numeral as shown at 52 in FIGS. 3 and 4.

In the exemplary first form of the invention illustrated, the normally upright steering post means 17 is provided with the handle means 19 which was previously generally mentioned and which, in this exemplary form, is shown as comprising a substantially transversely directed manually graspable handle means which includes a handle element mounting bracket means, indicated generally at 53, carried by the top of the steering post means 17, and two longitudinally transversely alignable handle elements 54A and 54B, each horizontally pivotally or hingedly mounted at its inner end by the hinge means 55 (best shown in FIG. 7) which is connected to the mounting bracket means 53 whereby to cause each of said handle elements 54A and 54B to be controllably movable about the effective pivot pin or hinge means 55 between horizontally aligned operative and locked relationship, as best shown in FIGS. 1, 7, and 8, and a vertically directed substantially parallel folded non-operative relationship as shown in phantom in FIG. 3.

The locking of said alignable handle elements 54A and 54B mentioned above is provided by handle elements retaining and locking means, indicated generally at 56 and best shown in FIG. 8, which, in said exemplary form, is shown as comprising a spring latch member 59 having locking projection means 61 adjacent to each end thereof aligned with corresponding aperture means 62 in one side of the mounting bracket means 53 and in corresponding portions of the alignable handle elements 54A and 54B whereby to firmly lock them in the aligned relationship shown in solid lines in FIGS. 1, 7, and 8 when said projections 61 lie in said holes 62. However, the spring latch means 59 can be manually forcibly sprung away from its central fastening point 63 so as to forcibly remove the projections 61 from the holes 62, which will allow the alignable handle elements 54A and 54B to be folded upwardly around the pivot pin or hinge means 55 (best shown in FIG. 7) into the substantially parallel upwardly directed non-operative relationship shown in phantom in FIG. 3.

FIG. 9 illustrates, in fragmentary form, several slight modifications of various of the structural members of the first form of the invention illustrated in detail in FIGS. 1–8 and described in detail hereinbefore. In view of the substantial similarity of the structures except for slight differences in the actual construction of some of the structural members and connections thereof to the rest of the apparatus, elements in this view which correspond functionally to those of the first form of the invention are indicated by similar reference numerals, primed, however.

It will also be noted that all of the connection members similar to those shown at 23 and 48 in the first form of the invention illustrated in FIGS. 1–8 are slightly modified to provide the very simplest and most inexpensive type of wire construction. Just the two front ones of said connection members are shown at 23′ in FIG. 9. However, it should be clearly understood that the two rear ones, corresponding to the connection members shown at 48 in the first form of the invention, are of similar construction to the two front ones shown at 23′ in FIG. 9. It should also be noted that the pivotal connection of the mounting handle means 17′ is slightly different in this modified form of the invention from that illustrated in the first form of the invention shown in FIGS. 1–8. This pivotal mounting modification is clearly shown in FIG. 9. Both of these modifications are primarily for the purpose of making it possible to manufacture the device so inexpensively as to widen the scope of general usage thereof. It is believed that further description of these very slight modifications of constructional details are unnecessary in view of the full and complete disclosure provided hereinbefore of the first exemplary form of the invention and in view of the complete adequacy of the disclosure of these very slight constructional detailed modifications as shown fragmentarily in FIG. 9 and as amplified by this clarifying explanation thereof as set forth above.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. A collapsible snow scooter comprising: longitudinal foot-supporting normally substantially horizontally positioned platform means, said longitudinal platform means having a front end and a rear end and being provided adjacent to said front end with normally upwardly directed steering post means effectively rotatively coupled with respect to said platform means for manually controlled rotation around a substantially vertical axis in response to rotary actuation of said steering post means; a front snow-engageable planing means spacedly underlying a front portion of said platform means and a bottom end of said steering post means and being provided with upwardly directed rigid connection and structural supporting means rigidly connecting same with respect to said bottom end of said steering post means; controllably collapsible steering post mounting and support means effectively interconnecting a lower portion of said steering post means with respect to said front snow-engageable planing means and with respect to said front portion of said platform means for controllable movement into an operative position with said steering post means positioned in said normally upwardly directed relationship with respect to said platform means and said front snow-engageable planing means and for controllable collapsing and folding pivotal movement of said steering post means about a horizontal axis positioned immediately above said front portion of said platform means, with said steering post means positioned substantially parallel to, and lying closely vertically adjacent to, said longitudinal platform means, said controllably collapsible steering post mounting and support means comprising two angularly downwardly and forwardly outwardly divergingly directed structural members having rear ends provided with, and pivotally connected with respect to, pivotal junction means carried by said steering post means longitudinally spaced from the bottom end thereof, said two structural members having forward end portions controllably lockably engageable in either of two different longitudinally displaced extreme positions relative to said front snow-engageable planing means whereby to provide for said controlled pivotal movement of said steering post means between horizontal fully collapsed position and said upright operative position and for the effective locking of same in said upright operative position; and a rear snow-engageable planing means spacedly underlying a rear portion of said platform means in substantially the same manner as the spaced underlying relationship of said front snow-engageable planing means with respect to the front portion of said platform means and positioned immediately therebehind and being provided with upwardly directed rigid connection and structural supporting means rigidly connecting same with respect to said platform means adjacent to said rear end of said platform means for supporting relationship with respect to said rear end of said platform means.

2. A scooter as defined in claim 1, wherein said normally upright steering post means is provided adjacent to a top end thereof with manually graspable handle means.

3. A scooter as defined in claim 1, wherein said normally upright steering post means is provided adjacent to a top end thereof with manually graspable handle means, said handle means comprising handle-element-mounting bracket means carried by said steering post means and two longitudinally transversely alignable handle elements, each horizontally pivotally mounted at its inner end with respect thereto and controllably movable between horizontally aligned operative and locked relationship and longitudinally directed parallel folded non-operative relationship.

4. A scooter as defined in claim 1, wherein said normally upright steering post means is provided adjacent to a top end thereof with manually graspable handle means, said handle means comprising handle-element-mounting bracket means carried by said steering post means and two longitudinally transversely alignable handle elements, each horizontally pivotally mounted at its inner end with respect thereto and controllably movable between horizontally aligned operative and locked relationship and longitudinally directed parallel folded non-operative relationship, said handle-element-mounting bracket means being effectively provided with handle element retaining and locking means for controllably locking said handle means in said horizontally aligned operative relationship when desired.

5. A collapsible scooter comprising: longitudinal foot-supporting normally substantially horizontally positioned platform means, said longitudinal platform means having a front end and a rear end and being provided adjacent to said front end with normally upwardly directed steering post means effectively provided with rotary coupling means effectively rotatively coupling said steering post means with respect to said platform means for manually controlled rotation around a substantially vertical axis in response to rotary actuation of said steering post means; a front snow-engageable planing means spacedly underlying said front end of said platform means and a bottom end of said steering post means and being provided with upwardly directed rigid connection and structural supporting means rigidly connecting same with respect to said bottom end of said steering post means below said rotary coupling; said front snow-engageable planing means being provided with an upwardly curved forward end and a rearwardly directed coupling panel member rotatively connected with respect to said steering post means immediately above said rotary coupling means, and the rotary coupling of said steering post means with respect to said platform means, and immediately above the surface of said platform means and in a longitudinally locked manner with respect to said steering post means; controllably collapsible steering post mounting and support means effectively interconnecting a lower portion of said steering post means with respect to said coupling panel member of said front snow-engageable planing means, and said front end portion of said platform means relatively rotatively but non-vertically movably coupled thereto, for controllable movement into an operative position with said steering post means positioned in said normally upwardly directed relationship with respect to said platform means and said front snow-engageable planing means and for controllable collapsing and folding pivotal movement of said steering post means about a horizontal axis positioned immediately above said coupling panel member of said front snow-engageable planing means and said front end of said platform means, with said steering post means positioned substantially parallel to, and lying closely vertically adjacent to, said longitudinal platform means; and a rear snow-engageable planing means spacedly underlying said rear end of said platform means in substantially the same manner as the spaced underlying relationship of said front snow-engageable planing means with respect to said front end of said platform means and positioned immediately therebehind and being provided with upwardly directed rigid connection and structural supporting means rigidly connecting same with respect to said platform means adjacent to said rear end of said platform means for supporting relationship with respect to said rear end of said platform means; said controllably collapsible steering post mounting and support means comprising two angularly downwardly and forwardly outwardly divergingly directed structural members having rear ends provided with, and pivotally connected with respect to, pivotal junction means carried by said steering post means longitudinally spaced from the bottom end thereof, said two structural members having forward end portions controllably lockably engageable in either of two different longitudinally displaced extreme positions with respect to said coupling panel member of said front snow-engageable planing means whereby to provide for said controlled pivotal movement of said steering post means between horizontal fully collapsed position and said upright operative position and for the effective locking of same in said upright operative position.

6. A scooter as defined in claim 5, wherein said controllably collapsible steering post mounting and support means comprises two angularly downwardly and forwardly outwardly divergingly directed structural members having rear ends provided with, and pivotally connected with respect to, pivotal junction means carried by said steering post means longitudinally spaced from the bottom end thereof, said two structural members having forward end portions controllably lockably engageable in either of two different longitudinally displaced extreme positions with respect to said coupling panel member of said front snow-engageable planing means whereby to provide for said controlled pivotal movement of said steering post means between horizontal fully collapsed position and said upright operative position and for the effective locking of same in said upright operative position, said coupling panel member of said front snow-engageable planing member being provided with retaining means carried by the sides thereof positioned for controllable retaining engagement and disengagement with respect to said forward ends of said forwardly angularly directed structural members of said steering post mounting and support means whereby to retain said steering post means in said upright operative position.

7. A scooter as defined in claim 5, wherein said normally upright steering post means is provided adjacent to a top end thereof with manually graspable handle means.

8. A scooter as defined in claim 5, wherein said normally upright steering post means is provided adjacent to a top end thereof with manually graspable handle means, said handle means comprising handle-element-mounting bracket means carried by said steering post means and two longitudinally transversely alignable handle elements, each horizontally pivotally mounted at its inner end with respect thereto and controllably movable between horizontally aligned operative and locked relationship and longitudinally directed parallel folded non-operative relationship.

9. A scooter as defined in claim 5, wherein said normally upright steering post means is provided adjacent to a top end thereof with manually graspable handle means, said handle means comprising handle-element-mounting bracket means carried by said steering post means and two longitudinally transversely alignable handle elements, each horizontally pivotally mounted at its inner end with respect thereto and controllably movable between horizontally aligned operative and locked relationship and longitudinally directed parallel folded non-operative relationship, said handle-element-mounting bracket means being effectively provided with handle element retaining and locking means for controllably locking said handle means in said horizontally aligned operative relationship when desired.

10. A scooter as defined in claim 5, wherein each of said front and rear snow-engageable planing means has a pair of longitudinal substantially parallel runners having bottom edges similarly extending slightly below the bottom surface of said snow-engageable planing means.

References Cited in the file of this patent
UNITED STATES PATENTS

| | | |
|---|---|---|
| 1,354,909 | Johnson | Oct. 5, 1920 |
| 2,513,199 | Ohlhaver | June 27, 1950 |
| 2,711,326 | Sorensen | June 21, 1955 |